(12) United States Patent
Kikuchi

(10) Patent No.: US 9,149,864 B2
(45) Date of Patent: Oct. 6, 2015

(54) RIVET SETTER

(71) Applicant: Kabushiki Kaisha F.C.C., Hamamatsu-shi, Shizuoka (JP)

(72) Inventor: Tsunetaka Kikuchi, Hamamatsu (JP)

(73) Assignee: KABUSHIK KAISHA F.C.C., Shizuoka (JP)

( * ) Notice: Subject to any disclaimer, the term of this patent is extended or adjusted under 35 U.S.C. 154(b) by 0 days.

(21) Appl. No.: 13/657,747

(22) Filed: Oct. 22, 2012

(65) Prior Publication Data
US 2013/0047425 A1 Feb. 28, 2013

Related U.S. Application Data

(63) Continuation of application No. PCT/JP2011/059732, filed on Apr. 20, 2011.

(30) Foreign Application Priority Data

Apr. 22, 2010 (JP) .................................. 2010/099023

(51) Int. Cl.
B23Q 7/10 (2006.01)
B21J 15/00 (2006.01)
(Continued)

(52) U.S. Cl.
CPC ...... *B21J 15/14* (2013.01); *B21J 15/32* (2013.01); *F16F 15/1203* (2013.01); *Y10T 29/5377* (2015.01); *Y10T 29/53478* (2015.01)

(58) Field of Classification Search
CPC ..... B21J 15/14; B21J 15/32; Y10T 29/53478; F16F 15/1203
USPC ........ 29/811.2, 525.06, 524.1, 812.5, 243.53, 29/816, 818, 525.05, 34 B; 227/15, 112, 227/116
See application file for complete search history.

(56) References Cited

U.S. PATENT DOCUMENTS 4,005,519 A * 2/1977 Di Maio et al. .................. 29/818
4,410,103 A * 10/1983 Fuhrmeister .................... 221/25
(Continued)

FOREIGN PATENT DOCUMENTS

CN 2873359 Y 2/2007
JP 46-18313 6/1971
(Continued)

OTHER PUBLICATIONS

International Search Report for PCT/JP2011/0589732 mailed on Aug. 2, 2011.

*Primary Examiner* — Essama Omgba
*Assistant Examiner* — Darrell C Ford
(74) *Attorney, Agent, or Firm* — Knobbe Martens Olson & Bear LLP

(57) ABSTRACT

A rivet setter which can efficiently and smoothly perform the rivet setting operation even when setting rivets each having a shank of its length smaller than a diameter of its head. The rivet setter can be configured to set a rivet sequentially fed one by one from a rivet supplying means by inserting the rivet into apertures formed at predetermined positions on workpieces. The rivet setter can comprise delivery paths for delivering the rivet one by one by forcing the rivet to be slid down to a settable position. The rivet setter can include notches formed on the bottom surfaces of the delivery paths along the rivet delivery direction and extending to the settable position for supporting the head of the rivet in the course of delivery of the rivet on the delivery paths and for hanging the shank of the rivet downward.

8 Claims, 10 Drawing Sheets

(51) Int. Cl.
    *B21J 15/02*     (2006.01)
    *B21D 39/00*     (2006.01)
    *B23P 11/00*     (2006.01)
    *B21J 15/14*     (2006.01)
    *B21J 15/32*     (2006.01)
    *F16F 15/12*     (2006.01)

(56) References Cited

U.S. PATENT DOCUMENTS

| | | | | |
|---|---|---|---|---|
| 4,535,925 A * | 8/1985 | Ramey et al. | | 227/55 |
| 4,609,134 A * | 9/1986 | Davern | | 227/112 |
| 4,744,238 A * | 5/1988 | Halbert | | 29/812.5 |
| 4,765,175 A | 8/1988 | Denham et al. | | |
| 5,123,162 A * | 6/1992 | Wing et al. | | 29/818 |
| 5,205,456 A * | 4/1993 | Ohuchi et al. | | 227/57 |
| 5,285,567 A * | 2/1994 | Thuswaldner | | 29/786 |
| 5,392,954 A * | 2/1995 | Gartz | | 221/165 |
| 5,544,407 A * | 8/1996 | Ohuchi et al. | | 29/525.06 |
| 5,651,169 A * | 7/1997 | Ohuchi et al. | | 29/243.525 |
| 5,778,516 A * | 7/1998 | Dear et al. | | 29/707 |
| 5,779,127 A * | 7/1998 | Blacket et al. | | 227/107 |
| 5,964,393 A * | 10/1999 | Feldpausch et al. | | 227/135 |
| 6,029,814 A * | 2/2000 | Ohuchi | | 206/347 |
| 6,089,437 A * | 7/2000 | Blacket et al. | | 227/136 |
| 6,098,442 A * | 8/2000 | Walldorf et al. | | 72/391.6 |
| 6,148,507 A * | 11/2000 | Swanson et al. | | 29/816 |
| 6,519,997 B2 * | 2/2003 | Luhm et al. | | 72/391.6 |
| 6,592,015 B1 * | 7/2003 | Gostylla et al. | | 227/112 |
| 6,944,944 B1 * | 9/2005 | Craythorn et al. | | 29/798 |
| 7,043,827 B2 * | 5/2006 | Ohuchi et al. | | 29/823 |
| 7,076,866 B2 * | 7/2006 | Iannucci | | 29/809 |
| 7,159,291 B2 * | 1/2007 | Ohuchi | | 29/243.525 |
| 2001/0054221 A1 * | 12/2001 | Ohuchi | | 29/243.521 |
| 2002/0050440 A1 * | 5/2002 | Reiter | | 198/389 |
| 2005/0081373 A1 * | 4/2005 | Seidler | | 29/811.2 |
| 2005/0155221 A1 * | 7/2005 | Fulbright | | 29/812.5 |
| 2006/0059678 A1 * | 3/2006 | Mauer et al. | | 29/525.06 |
| 2006/0080823 A1 * | 4/2006 | Joseph et al. | | 29/524.1 |
| 2006/0201988 A1 * | 9/2006 | Bouman | | 227/107 |
| 2007/0079504 A1 * | 4/2007 | Fulbright | | 29/812.5 |
| 2007/0271761 A1 * | 11/2007 | Haytayan | | 29/432 |
| 2007/0289354 A1 * | 12/2007 | Reiter | | 72/424 |
| 2008/0290129 A1 * | 11/2008 | Schell et al. | | 227/8 |
| 2012/0227256 A1 * | 9/2012 | Clew et al. | | 29/816 |
| 2013/0019457 A1 * | 1/2013 | Moeser et al. | | 29/525.06 |
| 2015/0052732 A1 * | 2/2015 | Craythorn et al. | | 29/525.01 |

FOREIGN PATENT DOCUMENTS

| | | |
|---|---|---|
| JP | 47-32223 | 9/1972 |
| JP | 50-12627 | 5/1975 |
| JP | 51-42345 | 11/1976 |

* cited by examiner

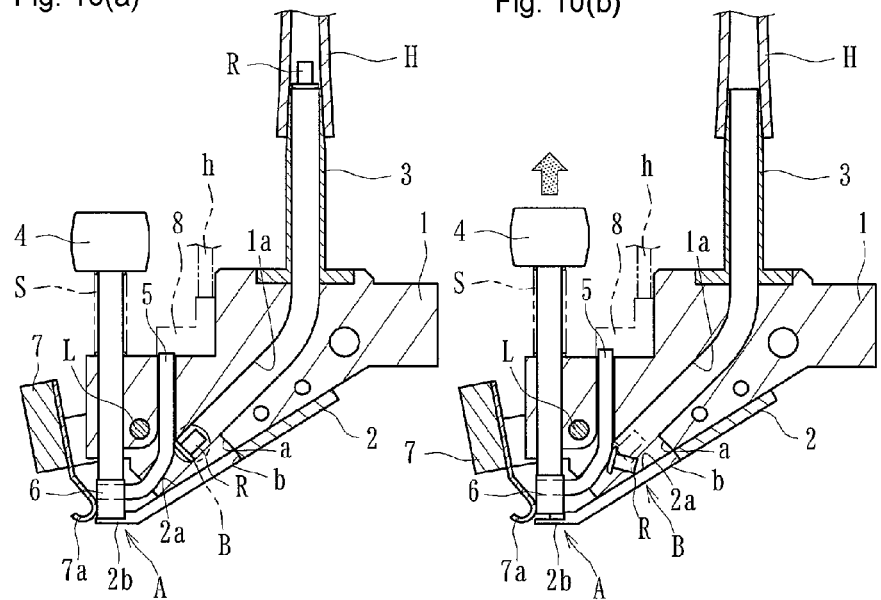

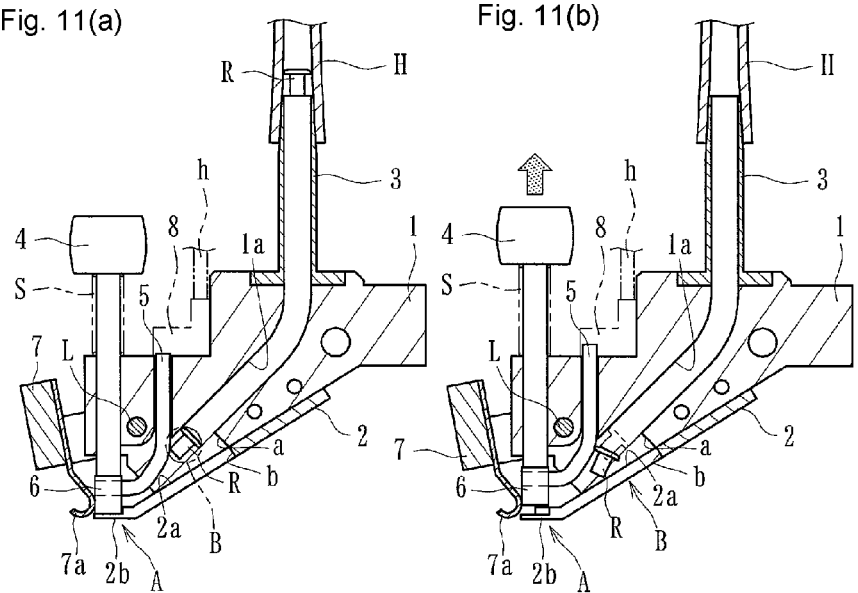

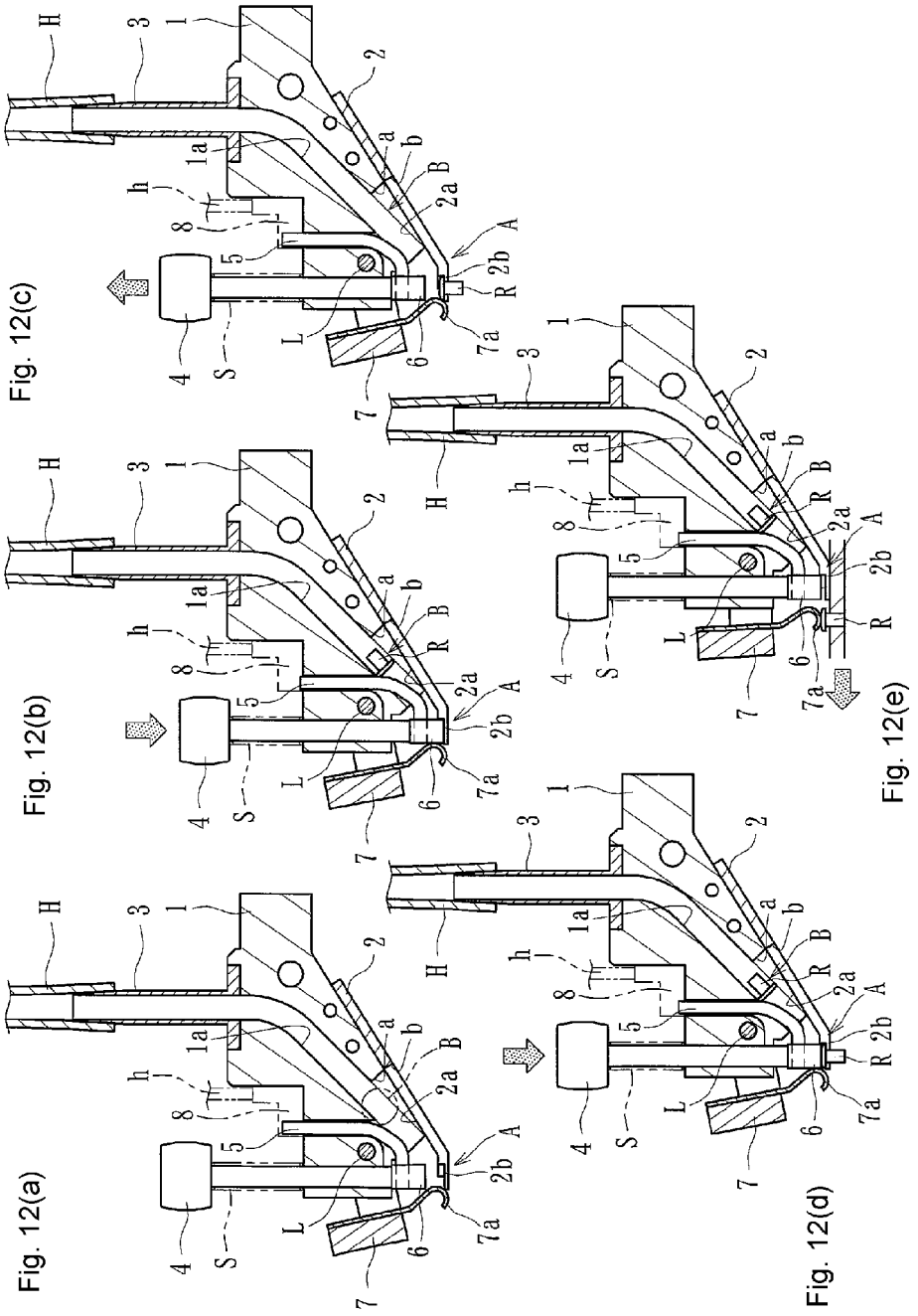

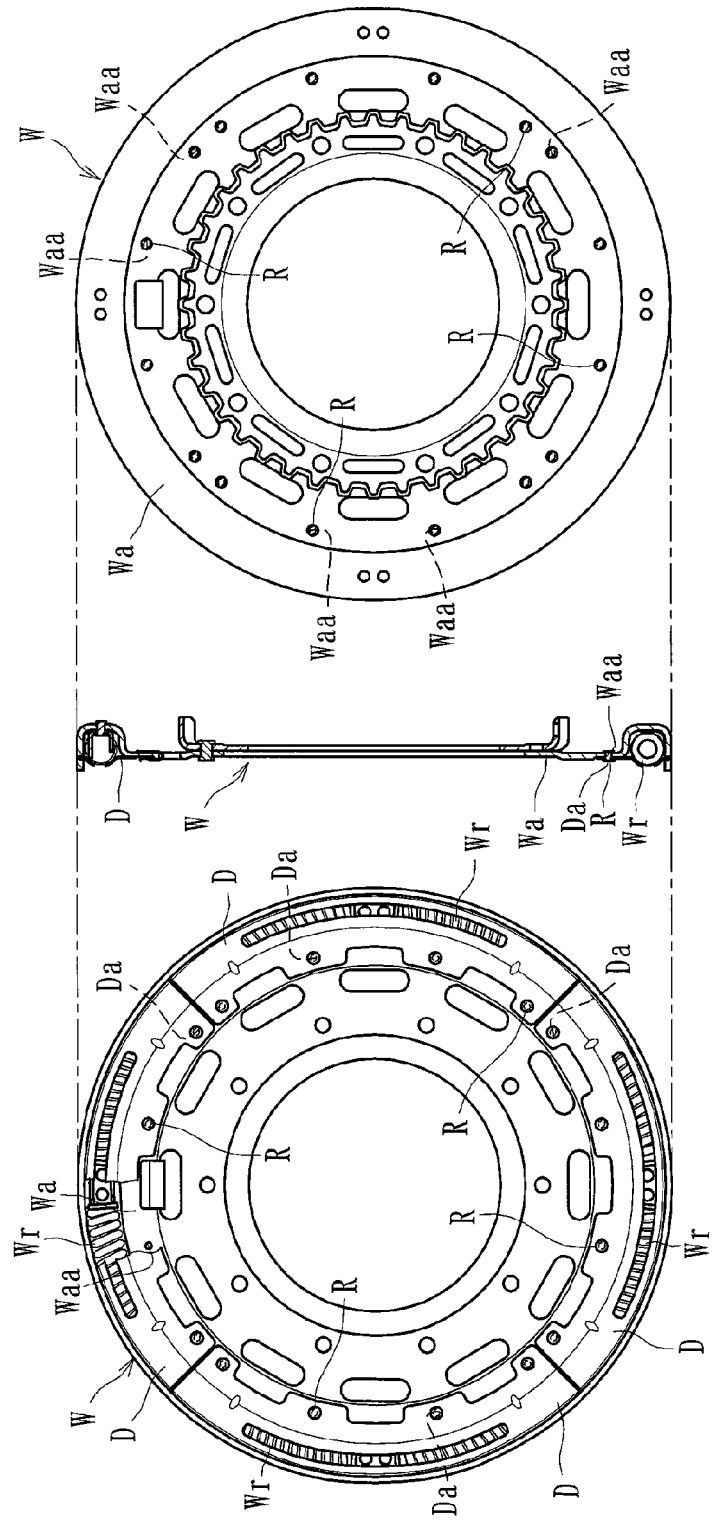

RIVET SETTER

CROSS-REFERENCE TO RELATED APPLICATIONS

This is a continuation of PCT Application No. PCT/JP2011/059732, filed on Apr. 20, 2011, which claims priority to Japanese Patent Application No. 2010-099023, filed on Apr. 22, 2010. The foregoing applications are hereby incorporated by reference herein in their entirety.

BACKGROUND OF THE DISCLOSURE

1. Field of the Disclosure

The present invention relates to a rivet setter for individually setting rivets sequentially fed one by one from a rivet supplying means by inserting the rivet into through apertures formed at predetermined positions on workpieces.

2. Description of the Related Art

A rivet setter for setting a rivet by inserting the rivet into apertures formed at predetermined positions on workpieces is sometimes constructed to be connected to a rivet supplying means via a hose, with the rivets sequentially fed one by one by compressed air from the rivet supplying means. The rivet setter can be operated by being gripped by an operator and can comprise a delivery path for delivering rivets to a settable position, engaging claws for engaging the head of rivet fed to the settable position and making the shank (e.g., a portion of a rivet of a small diameter formed continuously with the head so as to be caulked) of rivet to be projected to the outside, and a pressing-down member for pressing down the head of a rivet engaged with the claws.

A rivet can be set in one of apertures formed in predetermined positions of workpieces by inserting the shank of rivet while keeping its head being engaged with the engaging claws and then by forcing the head of rivet to be pressed down by the pressing-down member simultaneously with releasing the head from engagement with the engaging claws. Thus, the caulking of the rivet can be performed by crushing the tip end of respective shank of rivet by a caulking apparatus after rivets have been set in all apertures of workpieces. Since such a technology of the prior art is not a known invention disclosed in any document, there is no information disclosed in documents of the prior art.

SUMMARY OF THE DISCLOSURE

In the rivet setter described above, it is possible, if not likely, that the attitudes of rivets fed from the rivet supplying means are varied during their delivery from the rivet supplying means through a hose and delivery paths which results in attitude different from the attitude when it is delivered to the settable position. Especially when setting a rivet having a shank of its length smaller than a diameter of its head, the probability of the attitude variation during its delivery would be so increased that efficient and smooth setting operation of the rivet becomes difficult. Accordingly, it is conventionally practical to set rivets each having a shank of its length smaller as compared with a diameter of its head using tools such as pliers without using a rivet setter and thus the workability of rivet setting can be diminished.

An aspect of at least one of the inventions disclosed herein includes providing a rivet setter which can efficiently and smoothly perform the rivet setting operation even when setting rivets each having a shank length smaller than a diameter of a head.

Thus, in accordance with an embodiment, a rivet setter for setting a rivet sequentially fed one by one from a rivet supplying means by inserting the rivet into apertures formed at predetermined positions on workpieces comprises delivery paths for delivering the rivet one by one by forcing the rivet to be slid down to a settable position. The rivet setter can include notches formed on the bottom surfaces of the delivery paths along the rivet delivery direction and extending to the settable position for supporting the head of the rivet in the course of delivery on the delivery paths and for hanging the shank of the rivet downward.

In some embodiments, the rivet setter comprises a stopper configured to project and retract relative to the delivery paths for stopping the rivet at a waiting position by interfering with the rivet in the course of delivery on the delivery paths to the settable position.

In some embodiments, the notches extend from the settable position at least to the waiting position.

According to some variants, the rivet setter comprises an operation knob for arbitrarily projecting and retracting the stopper relative to the delivery paths by pressing down the operation knob. In some embodiments, the rivet can be sequentially fed from the rivet supplying means in response to the pressing-down operation of the operation knob.

In some embodiments, the operation knob is formed with an abutting portion configured to be abutted against the head of the rivet positioned in the settable position. The abutting portion can be movable between the abutting position and the separated position relative to the head of the rivet by operating the operation knob.

In some embodiments wherein the head of the rivet is supported by the notches formed in the delivery paths and their shanks are suspended downward, it is possible to deliver the rivet to the settable position while arranging its attitude in the suspended condition (e.g., the attitude of the shank being suspended downward) and to efficiently and smoothly perform the rivet setting operation even when setting rivets each having a shank length smaller than a diameter of a head.

In some embodiments wherein the rivet setter includes a stopper able to project and retract relative to the delivery paths for stopping the rivet at a waiting position while making the stopper interfere with the rivet in the course of delivery to the settable position, it is possible to stop the rivet vigorously fed from the rivet supplying means and then to slide the rivet down and deliver the rivet to the settable position. In some such embodiments, it is possible to more exactly and smoothly perform the delivery of rivet to the settable position.

According to some variants wherein the notches extend from the settable position at least to the waiting position, it is possible to stop the rivet at the waiting position and then to arrange its attitude in the suspended condition (e.g., the attitude of the shank being suspended downward). In some such variants, it is possible to further firmly arrange the attitude in the suspended condition (e.g., attitude of the shank being suspended downward) in the course of delivery on the delivery paths.

In some embodiments, wherein the rivet setter further comprises an operation knob for arbitrarily projecting and retracting the stopper relative to the delivery paths by pressing down the operation knob, and wherein the rivet can be sequentially fed from the rivet supplying means subjecting to the pressing-down operation of the operation knob, it is possible to perform the setting operation of rivet at an arbitrary timing.

According to some embodiments, wherein the operation knob is formed with an abutting portion able to be abutted against the head of the rivet positioned in the settable position, and wherein the abutting portion is movable between the abutting position and separated position relative to the head of the rivet by operating the operation knob, it is possible to smoothly and efficiently perform a next setting operation by making the abutting portion press down the head of rivet in the settable position. In some such embodiments, it is also possible to force a rivet sequentially fed from the rivet supplying means in accordance with the pressing-down operation of the operation knob to perform continuous setting operation of rivet.

BRIEF DESCRIPTION OF THE DRAWINGS

These and other features, aspects and advantages are described below with reference to the drawings, which are intended to illustrate but not to limit the disclosure. In like drawings, like reference characters denote corresponding features consistently throughout similar embodiments.

FIGS. 10(a)-(d) are schematic views illustrating the transition of the rivet from the waiting position to the settable position;

FIGS. 11(a)-(d) are schematic views illustrating the transition of the rivet (fed in a different direction from that in FIG. 10) from the waiting position to the settable position;

FIGS. 12(a)-(e) are schematic views illustrating the setting operation of rivet; and FIG. 13 is a three-direction view showing workpieces to which rivets are set by the rivet setter of FIG. 1.

DETAILED DESCRIPTION OF THE PREFERRED EMBODIMENT

Figure 1:
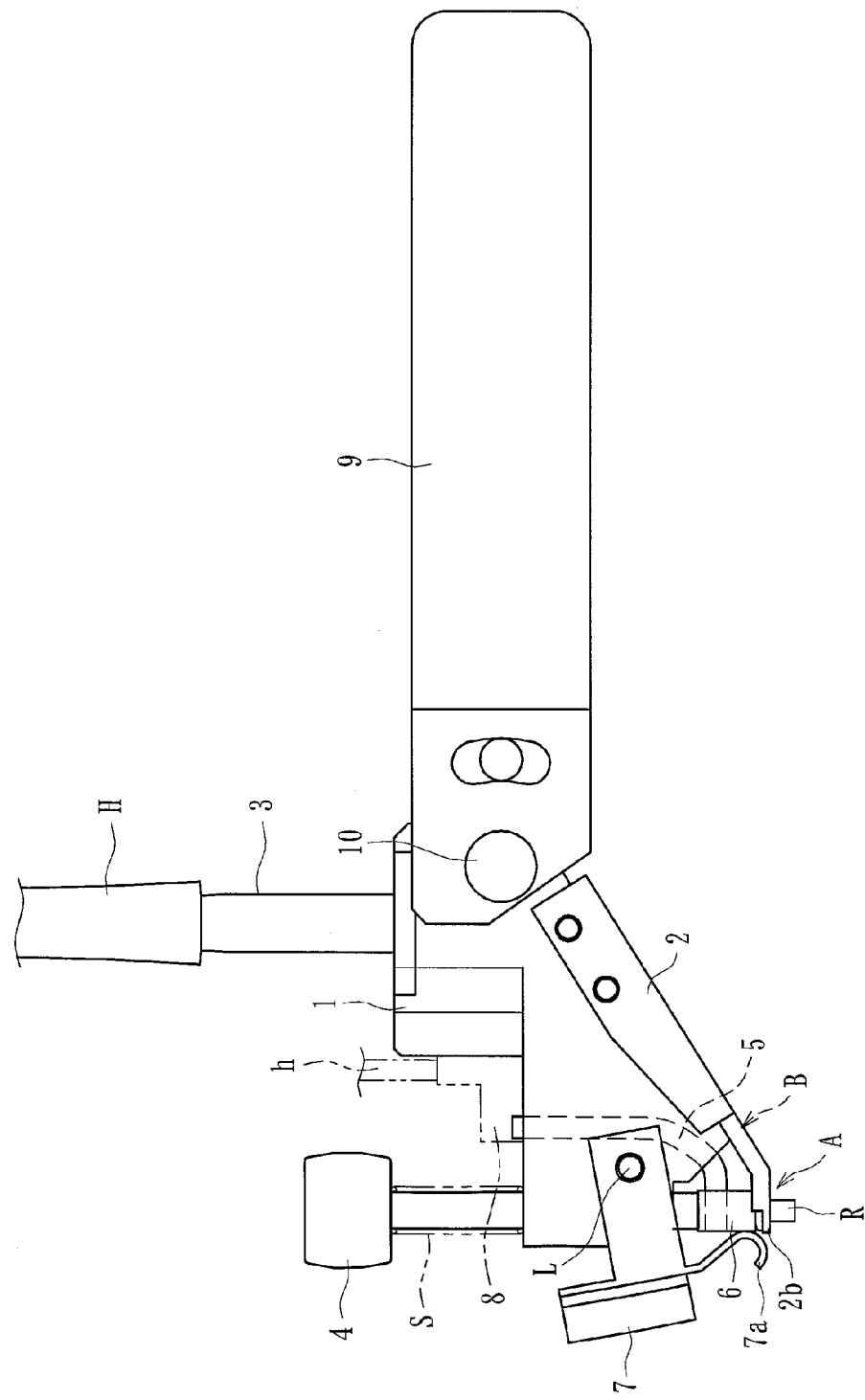
FIG. 1 is a front elevation view showing the rivet setter according to a preferable embodiment of the present invention.
Figure 2:
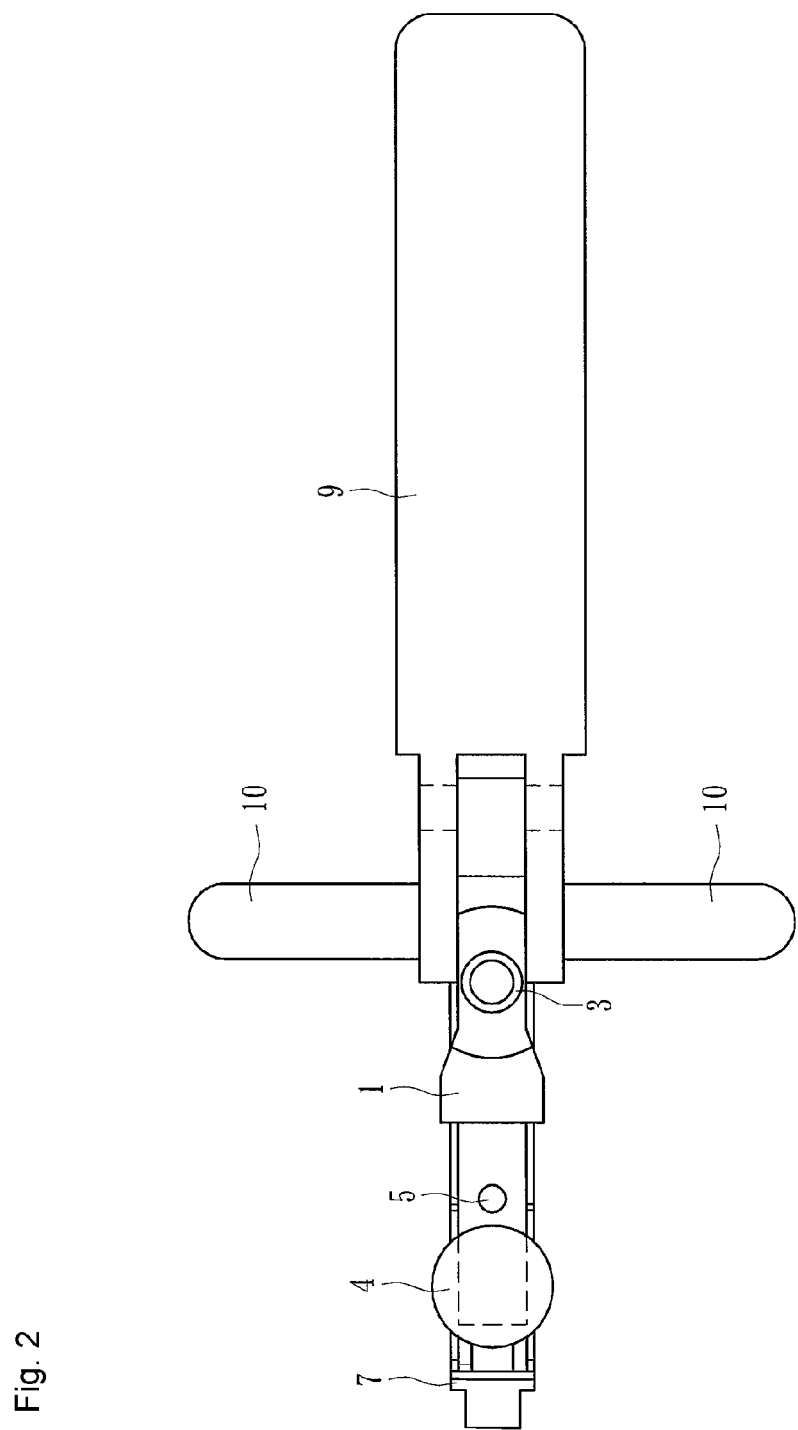
FIG. 2 is a plan view of the rivet setter of FIG. 1.

Several embodiments of the present disclosure are hereinafter described below with respect to the accompanying figures.

According to some embodiments, a rivet setter can be configured to set a rivet sequentially fed from a rivet supplying means by inserting the rivet to an aperture formed in workpieces. The rivet setter can comprise, as shown in FIGS. 1-5, a main body 1, a mounting member 2, an operation knob 4, a pressing-down member 7, and a detecting sensor 8.

In an illustrated embodiment, a torque damper apparatus (e.g., lock-up clutch apparatus) W is shown in FIG. 13 as one example of a workpiece to which rivets R are set. Other workpieces can be used, for example, if the rivets R are set and caulked. The torque damper apparatus W can be used to connect a torque converter cover and a turbine. In some embodiments, the torque damper apparatus W comprises a main body Wa holding a plurality of damper springs Wr on its periphery, and a pressing plate D for pressing the damper springs Wr.

According to some variants, the main body Wa is formed with apertures Waa and the pressing plate D is formed with apertures Da, and the main body Wa and the pressing plate D can be joined by setting rivets R in aligned apertures Waa, Da and then caulking the shanks of rivets R using a separate caulking apparatus. A rivet setter as disclosed herein can be used for sequentially setting rivets R into the apertures Waa, Da in order to join the main body Wa and the pressing plate D of the torque damper apparatus W.

Figure 7:
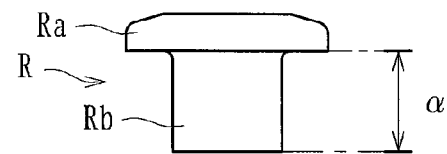
FIG. 7 is a schematic view of a rivet used in the rivet setter of FIG. 1.

An example of a rivet R to be set by the rivet setter of the present invention is shown in FIG. 7 and comprises a head Ra of a larger diameter and a shank Rb of a smaller diameter formed integrally with the head Ra. The caulking can be performed by crushing the tip end of the shank of rivet. The illustrated rivet R has a shank Rb of relatively short length "α" which is substantially same as the diameter of the head Ra.

Figure 6:
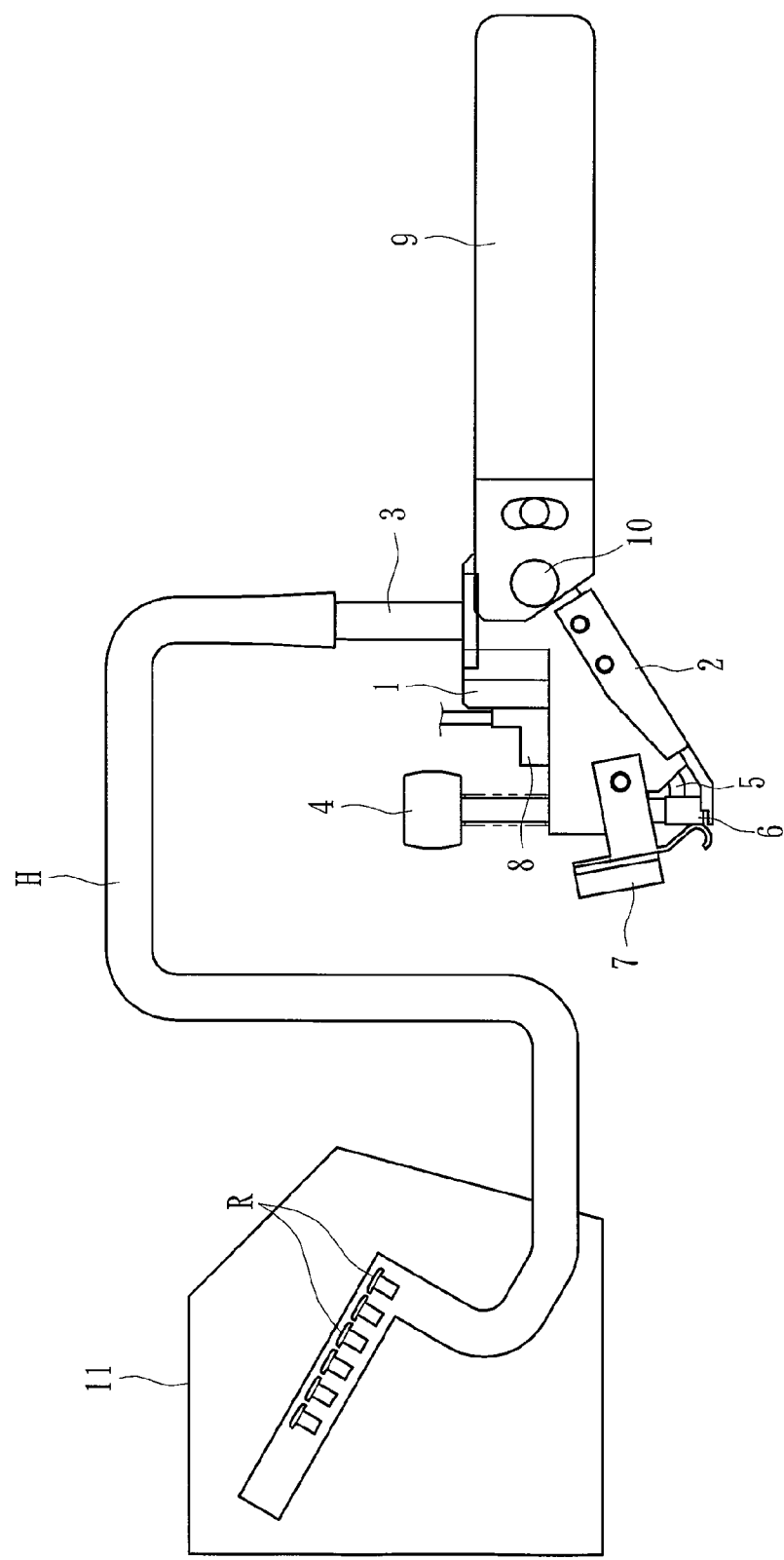
FIG. 6 is a schematic view of a rivet supplying means to which the rivet setter of FIG. 1 is connected.

The main body 1 can form a casing of the rivet setter and can have a connecting pipe 3 projected from the main body 1 to which a hose H is connected. The other end of the hose H can be connected to a rivet supplying means 11 (e.g., see FIG. 6) for sequentially feeding rivets R by compressed air to the main body 1 via the hose H.

Figure 3:
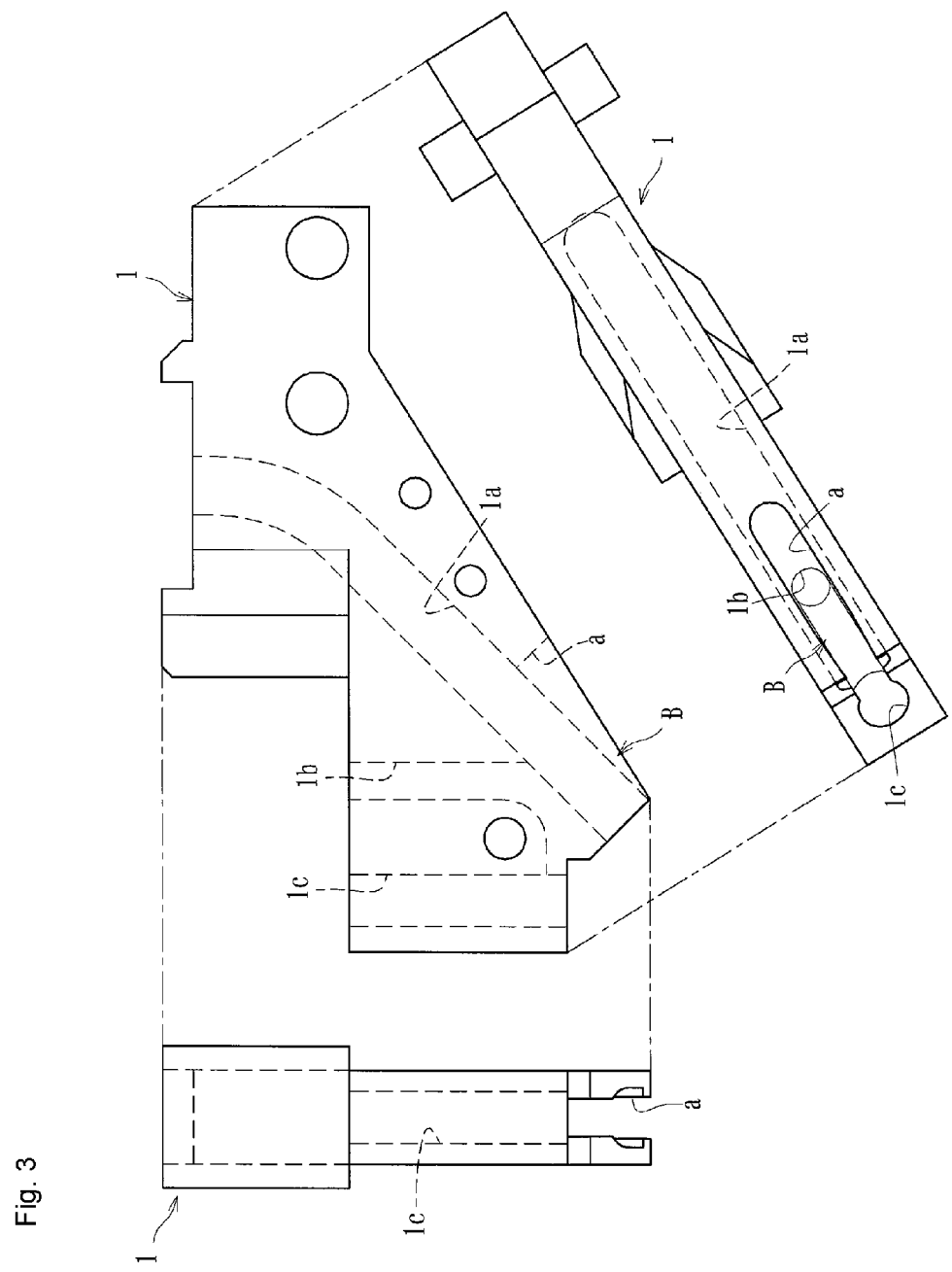
FIG. 3 is a three-direction view of the main body of the rivet setter of FIG. 1.
Figure 4:
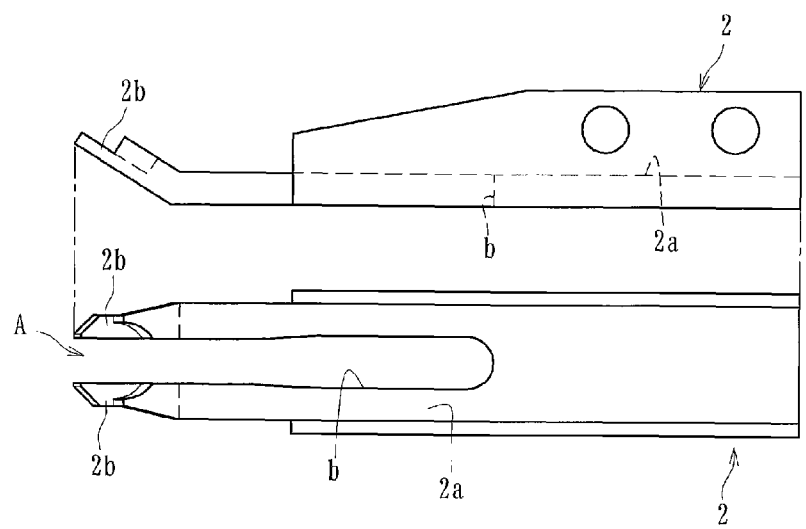
FIG. 4 is a front elevation view and a plan view of a mounting member of the rivet setter of FIG. 1.
Figure 5:
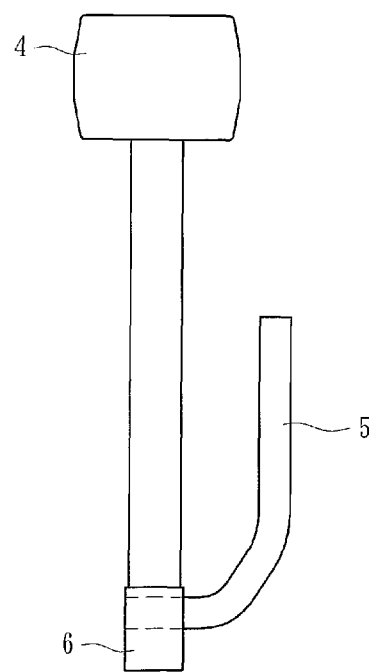
FIG. 5 is a schematic view of an operation knob of the rivet setter of FIG. 1.

As shown in FIG. 3, the main body 1 can be formed with a delivery path 1a to be communicated with the connecting pipe 3 (e.g., see FIG. 1), and insert bores 1c and 1b into which the operation knob 4 and a stopper 5 (e.g., see FIG. 5) can be inserted, respectively. The delivery path 1a can be formed as a passage smoothly curved downward for passing rivets R therethrough and adapted to be continued with a delivery path 2a (e.g., see FIG. 4) of the mounting member 2 so that rivets R can slide down along the delivery paths 1a, 2a.

The mounting member 2 can be mounted on the lower portion of the main body 1 and can include the delivery path 2a and a hanging support portion 2b. As previously described, the delivery path 2a can be continuously connected to the delivery path 1a to deliver the rivet R and the hanging support portion 2b for supporting the rivet R in a suspended condition can be formed at the tip end of the delivery path 2a. In some embodiments, the hanging support portion 2b comprises two left/right bar shaped members formed by a notch "b" for hanging the head Ra of rivet R thereon. The hanging support can form a "settable position A" at which the rivet R can be set on the workpieces.

In some embodiments, the continuous condition of the delivery paths 1a, 2a can be achieved under a condition in which the mounting member 2 is mounted on the main body 1. In some such embodiments, it is possible to slide the rivet R fed from the rivet supplying means 11 down to the settable position A. An operator can handle the rivet setter with gripping grippers 9, 10 mounted on the main body 1.

According to some variants, notches "a", "b" are formed in the bottom surfaces of the delivery paths 1a, 2a respectively. These notches "a", "b" can be formed along the rivet delivery direction, can extend to the settable position A for supporting the head Ra of the rivet R in the course of delivery on the delivery paths 1a, 2a, and can hang the shank Rb of the rivet R downward.

Figure 8:
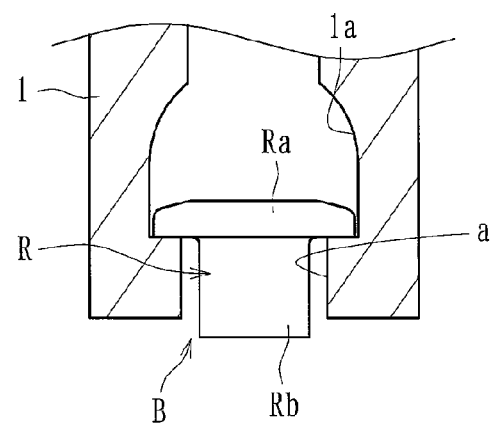
FIG. 8 is a schematic view of a rivet suspended by a notch of the rivet setter of FIG. 1.
Figure 9:
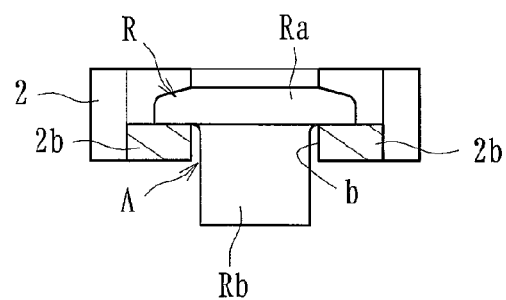
FIG. 9 is a schematic view of a rivet suspended by a notch at the settable position of the rivet setter of FIG. 1.

In the course of the rivet R sliding down the delivery path 1a, the head Ra of the rivet R can be supported on both edges of the notch "a" and the shank Rb of the rivet R can be suspended downward, as shown in FIG. 8. In the course of delivery on the delivery path 2a, the suspended condition can be kept by the notch "b" and the rivet R can be delivered to the settable position A wherein the suspended condition can remain kept by the notch "b" in the hanging support portion 2b, as shown in FIG. 9.

The operation knob 4 can include the abutting portion 6 formed on the tip end (e.g., the bottom end in FIG. 5) of the operation knob 4 and the stopper 5 extending from the tip end. In some embodiments, the operation knob 4 is mounted on the main body 1 by being inserted into the insert bore 1c (e.g., see FIG. 3) and ordinarily urged upward by a return spring S (e.g., see FIG. 1). The stopper 5 and the abutting portion 6 can be moved downward by pressing down the operation knob 4 downward and can be returned to its initial position by releasing the pressing-down force.

In some embodiments, when the operation knob 4 is inserted into the insert bore 1c, the stopper 5 is also inserted into the insert bore 1b, as shown in FIG. 10. The stopper 5 can project and retract relative to the delivery path 1a for stopping the rivet R at a waiting position B by interfering with the rivet R in the course of delivery on the delivery paths 1a, 2a to the settable position A. In some embodiments, the notches "a", "b" extend from the settable position A to the waiting position B. For example, in the illustrated embodiment, the notch "a" further extends a predetermined length beyond the waiting position B. In some configurations, the notches "a", "b" extend from the settable position A to at least the waiting position B.

In some variants, when the rivet R is slid down with its head Ra being directed forward as shown in FIG. 10, it is possible to stop the rivet R at the waiting position B by pressing down the operation knob 4 and forcing the stopper 5 to interfere with the rivet R (e.g., see FIG. 10(a)). The attitude of the stopped rivet R can be varied by the notch "a" of the delivery path 1a (e.g., see FIG. 10(b)) and can be shifted to the suspended condition as shown in FIG. 8 (e.g., see FIG. 10(c)). In some embodiments, the rivet R is slid down to the settable position A by its own weight while keeping the suspended condition by moving the operation knob 4 upward by releasing the pressing-down force applied thereto (e.g., see FIG. 10(d)).

In some embodiments, when the rivet R is slid down with its shank Rb being directed forward as shown in FIG. 11, it is possible to stop the rivet R at the waiting position B by pressing down the operation knob 4 and forcing the stopper 5 to interfere with the rivet R (e.g., see FIG. 11(a)). The attitude of stopped rivet R can be varied by the notch "a" of the delivery path 1a (e.g., see FIG. 11(b)) and can be shifted to the suspended condition as shown in FIG. 8 (e.g., see FIG. 11(c)). The rivet R can be slid down to the settable position A by its own weight while keeping the suspended condition by moving the operation knob 4 upward by releasing the pressing-down force applied thereto (e.g., see FIG. 11(d)).

The abutting portion 6 can be formed by a portion able to be abutted against head Ra of rivet R positioned in the settable position A. The abutting portion 6 can be movable between an abutted position (e.g., see FIG. 12(d)), in which the abutting portion 6 is abutted against the head Ra of rivet R by operating the operation knob 4, and a separated position (e.g., see FIG. 12(c)). In some embodiments, it is possible, as shown in FIG. 12(d), to press down the abutting portion 6 against the head Ra of rivet R positioned in the settable position A by pressing down the operation knob 4 after the rivet R having been delivered to the settable position A. In some such embodiments, it is possible, as shown in FIG. 12(e), to successfully set the rivet R in the apertures of workpieces (apertures Waa, Da in the illustrated embodiment) by moving the hanging support portion 2b horizontally while moving the entire rivet setter horizontally.

The pressing-down member 7 can be pivotably mounted on the main body 1 around a pivotal shaft L (e.g., see FIG. 1) and can have a pressing-down portion 7a. The pressing-down portion 7a can be used to abut and press the head Ra of rivet R during the process for setting the rivet R in the apertures of workpieces, as shown in FIG. 12(e). In some embodiments, the abutment of the abutting portion 6 against the head Ra of rivet R is replaced by the abutment of the pressing-down portion 7a after completion of the horizontal movement of the hanging support portion 2b when the whole the rivet setter moves horizontally. In some such embodiments, the head Ra of rivet R can be continuously pressed down by the pressing-down portion 7a during the setting process of the rivet R after the pressing-down by the abutting portion 6. Such pressing down by the pressing-down portion 7a can facilitate increased stability of the rivet R as the rivet R is set.

In some embodiments, the rivet setter includes a detecting sensor 8. The detecting sensor 8 can be a sensor for detecting the position of stopper 5 and can be formed by a conducting means which performs an electrical conduction when the stopper 5 is positioned in an upper position (e.g., when the stopper 5 is retracted from the delivery path 1a and does not interfere with the rivet R), and does not perform an electrical conduction when the stopper 5 is moved to a lower position (e.g., when the stopper 5 is projected to the delivery path 1a and interferes with the rivet R). The detecting sensor 8 may be another kind of sensor capable of detecting that the operation knob 4 is pressed down and the stopper 5 is moved to a position interfering with the rivet R.

The detecting sensor 8 can be electrically connected to the rivet supplying means 11 via a code "h" (e.g., see FIG. 1) to transmit detected signals of the detecting sensor 8 to the rivet supplying means 11. The detecting sensor 8 can be configured to detect whether the electrical conduction is cut off when the operation knob 4 is pressed down. This detected signal can be transmitted to the rivet supplying means 11 as a trigger signal to start the rivet supplying means 11 for supplying one rivet R to the rivet setter. In some embodiments, the rivet R can be sequentially fed from the rivet supplying means 11 subject to the pressing-down operation of the operation knob 4.

Referring to FIGS. 12(a)-12(e), the rivet R can be positioned in the waiting position B (e.g., see FIG. 12(b)) by pressing down the operation knob 4 in its initial position to make the rivet supplying means 11 feed the rivet R (e.g., see FIG. 12(a)) and to make the stopper 5 interfere with the rivet R in the course of the delivery path 1a. The operation knob 4 can be moved upward to its initial position by an urging force of the return spring S while the pressing-down force applied to the operation knob 4 is released. In some embodiments, the interference of the stopper 5 with the rivet R at the waiting position B can released and the rivet R can be further slid down and delivered to the settable position A by its own weight (e.g., see FIG. 12(c)).

The rivet R in the waiting position B can be supported by the notch "a" with the shank Rb being suspended downward (e.g., see FIG. 8) and then slid down the delivery paths 1a, 2a to the settable position A while keeping the suspended condition (e.g., see FIG. 9). The operation knob 4 can be pressed down again to make the rivet supplying means 11 feed the rivet R and to make the stopper 5 interfere with the rivet R in the course of the delivery path 1a and keep the rivet R to wait at the waiting position B while the abutting portion 6 of the operation knob 4 presses down the head Ra of the rivet R positioned in the settable position A (e.g., see FIG. 12(d)).

In some embodiments, by inserting the shank Rb of rivet R into the apertures (e.g., apertures Waa, Da in the illustrated embodiment) formed at predetermined positions of the workpieces and moving the hanging support portion 2b to a substantially horizontal direction (e.g., to the right in FIG. 12) by moving the entire rivet setter of the present invention, the head Ra of rivet R inserted into the apertures (e.g., the apertures Waa, Da) of the workpieces is pressed down by the pressing-down portion 7a of the pressing-down member in place of the abutting portion 6. When the rivet R is set in the apertures (e.g., apertures Waa, Da), the pressing-down force of the operation knob 4 can be released to return the knob 4 to its initial position to slide down a next rivet R to the settable position A. In some embodiments, it is possible to sequentially set the rivets R into the apertures (e.g., apertures Waa, Da) by repeating the operations similar to those of FIGS. 12(c)-(e).

In some embodiments, suspending the rivet R with its head Ra being supported by notches "a", "b" formed in the delivery paths 1a, 2a and its shank Rb being suspended downward can facilitate delivery the rivet R to the settable position A while arranging the attitude of the rivet R in the suspended condition (e.g., attitude of the shank Rb being suspended downward). In some such embodiments, it is possible to efficiently and smoothly perform the rivet setting operation even when setting rivets R each have a shank Rb of with a length smaller than a diameter of the head Ra of the rivet R.

In some embodiments, using a rivet setter having a stopper 5 able to project and retract relative to the delivery paths 1a, 2a for stopping the rivet R at a waiting position B by making the stopper 5 interfere with the rivet R in the course of delivery to the settable position A can facilitate stopping the rivet R vigorously fed from the rivet supplying means 11 and then to sliding down and delivering the rivet R to the settable position A. In some such embodiments, it is possible to more exactly and smoothly perform the delivery of rivet R to the settable position A.

According to some variants, having notches "a", "b" that extend from the settable position A at least to the waiting position B can facilitate stopping the rivet R at the waiting position B and then holding its attitude in the suspended condition (e.g., the attitude of the shank Rb being suspended downward). In some such variants, it is possible to further firmly hold the attitude in the suspended condition (e.g., the attitude of the shank Rb being suspended downward) in the course of delivery of the rivet R on the delivery paths 1a, 2a.

In some embodiments, using a rivet setter that includes an operation knob 4 for arbitrarily projecting and retracting the stopper 5 relative to the delivery path 1a by pressing down the operation knob 4, wherein the rivet R can be sequentially fed from the rivet supplying means 11 subjecting to the pressing-down operation of the operation knob 4, can facilitate performing the setting operation of rivet R at a predetermined or arbitrary timing. Although it is described and illustrated that the stopper 5 is integrally formed with the operation knob 4, it is possible to form them as separate parts and also possible to form them so that the stopper 5 is moved to the interfering position with the rivet R by a separate driving means when the pressing-down operation of the operation knob 4 is detected.

In some variants, when the operation knob 4 is formed with an abutting portion 6 able to be abutted against the head Ra of the rivet R positioned in the settable position A, and the abutting portion 6 is movable between the abutting position and separated position relative to the head Ra of the rivet R by operating the operation knob 4, it can be possible to smoothly and efficiently perform a next setting operation with making the abutting portion 6 press down the head Ra of rivet R in the settable position A. In some such variants, it can also be possible to force a rivet R sequentially fed from the rivet supplying means 11 in accordance with the pressing-down operation of the operation knob 4 and to perform continuous setting operation of rivet R.

Although the above embodiments have been described with reference to the certain preferred embodiments, the scope of the disclosure is not limited to the described and illustrated embodiments. For example, the rivet R may be set into the apertures (e.g., apertures Waa, Da) of the workpieces by pressing-down the rivet R positioned in the settable position A. In some embodiments, it is possible to make the rivet R wait at the waiting position B by operating only the stopper 5 with use of an operation knob not having the abutting portion 6 or pressing-down member 7. Although it is described that the rivet R is set into the apertures Waa, Da of the torque damper apparatus W (lock-up clutch apparatus), it may be possible to set the rivet R into apertures of any other workpieces.

The present disclosure can be applied to any rivet setter having a different external view or additional functions if it is a rivet setter comprising delivery paths for delivering the rivet one by one by forcing the rivet to be slid down to a settable position; and notches formed on the bottom surfaces of the delivery paths along the rivet delivery direction and extending to the settable position for supporting the head of the rivet in the course of delivery on the delivery paths and hanging the shank of the rivet downward.

What is claimed is:

1. A rivet setter for setting rivets sequentially fed one by one from a rivet supplying means by inserting the rivets into apertures formed at predetermined positions on workpieces, the rivet setter comprising:
   delivery paths for delivering the rivets one by one by forcing a rivet to be slid down to a settable position;
   notches formed on bottom surfaces of the delivery paths along a rivet delivery direction and extending to the settable position for supporting a head of the rivet in the course of delivery on the delivery paths and for hanging a shank of the rivet downward; and
   a stopper configured to projected and retract relative to the delivery paths for stopping the rivet at a waiting position by interfering with the rivet in the course of deliver on the delivery paths to the settable position;
   wherein each of the notches has a notch width greater than a diameter of the shank of the rivet and less than a diameter of the head of the rivet; and
   wherein each of the notches extends from the settable position at least to the waiting position.

2. The rivet setter of claim 1 wherein the delivery paths have an inlet and an outlet, and wherein the inlet of the delivery paths is configured to receive each of the rivets independent of the orientation of the head and shank of each of the rivets.

3. The rivet setter of claim 1 further comprising an operation knob for arbitrarily projecting and retracting the stopper relative to the delivery path by pressing down the operation knob, wherein each rivet is sequentially fed from the rivet supplying means in response to the pressing-down operation of the operation knob.

4. The rivet setter of claim 3 wherein the operation knob is formed with an abutting portion configured to be abutted against the head of the rivet positioned in the settable position, and wherein the abutting portion is movable between the abutting position and separated position relative to the head of the rivet by operating the operation knob.

5. A rivet setter for setting rivets sequentially fed one by one from a rivet supplying device by inserting the rivets into apertures formed at predetermined positions on workpieces, the rivet setter comprising:
   delivery paths for delivering the rivets one by one by forcing a rivet to be slid down to a settable position;
   notches formed on bottom surfaces of the delivery paths along a rivet delivery direction and extending to the settable position for supporting a head of the rivet in the course of delivery on the delivery paths and for hanging a shank of the rivet downward; and
   a stopper configured to projected and retract relative to the delivery paths for stopping the rivet at a waiting position by interfering with the rivet in the course of deliver on the delivery paths to the settable position;
   wherein each of the notches has a notch width greater than a diameter of the shank of the rivet and less than a diameter of the head of the rivet; and
   wherein each of the notches extends from the settable position at least to the waiting position.

6. The rivet setter of claim 5 wherein the delivery paths have an inlet and an outlet, and wherein the inlet of the delivery paths is configured to receive each of the rivets independent of the orientation of the head and shank of each of the rivets.

7. The rivet setter of claim 5 further comprising an operation knob for arbitrarily projecting and retracting the stopper relative to the delivery path by pressing down the operation knob, wherein each rivet is sequentially fed from the rivet supplying device in response to the pressing-down operation of the operation knob.

8. The rivet setter of claim 7 wherein the operation knob is formed with an abutting portion configured to be abutted against the head of the rivet positioned in the settable position, and wherein the abutting portion is movable between the abutting position and separated position relative to the head of the rivet by operating the operation knob.

* * * * *